Figure 3:
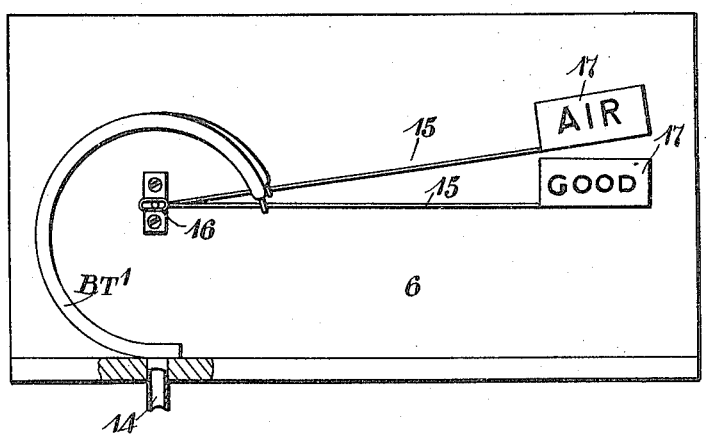

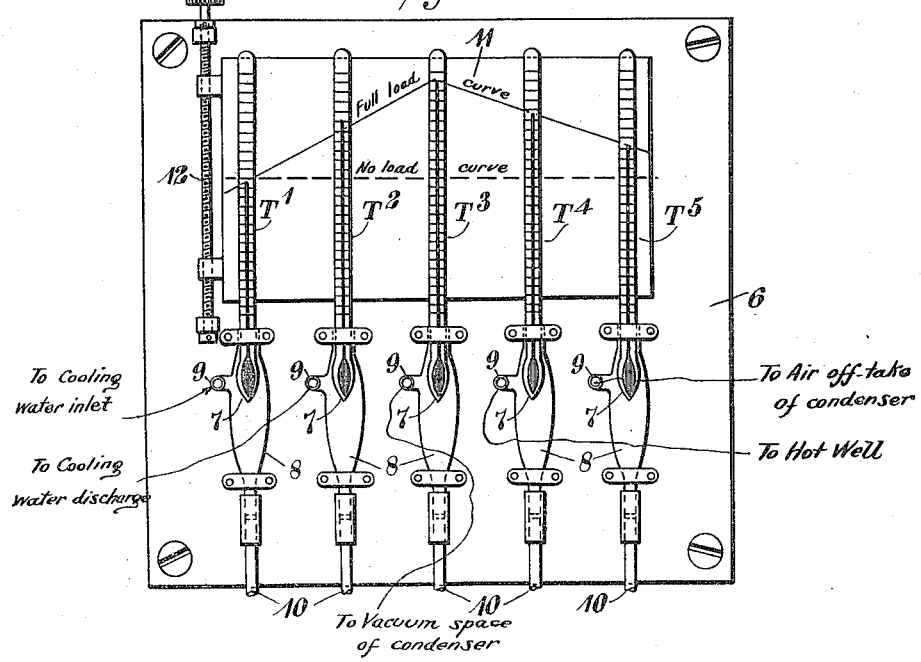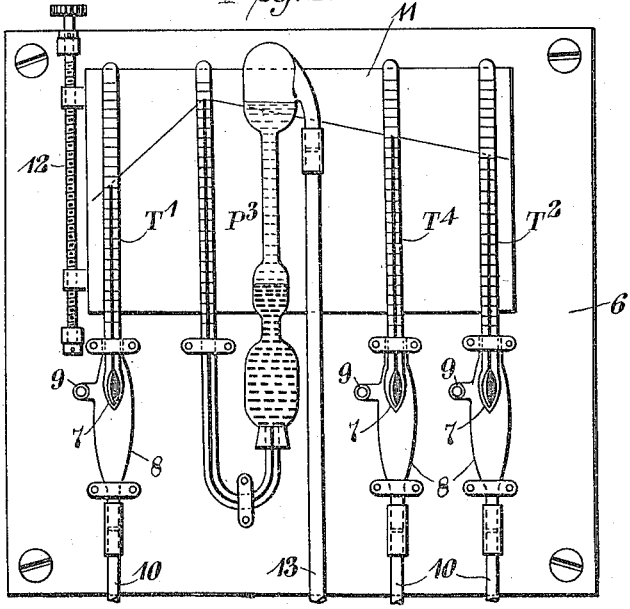

A. E. L. SCANES & K. BAUMANN.
APPARATUS FOR MEASURING OR INDICATING THE EFFICIENCY OF STEAM CONDENSERS.
APPLICATION FILED NOV. 24, 1914.

1,161,254.

Patented Nov. 23, 1915.
2 SHEETS—SHEET 2.

WITNESSES:

INVENTORS:
Arthur Edwin Leigh Scanes
Karl Baumann
BY
HIS ATTORNEY IN FACT.

UNITED STATES PATENT OFFICE.

ARTHUR EDWIN LEIGH SCANES, OF ASHTON-UPON-MERSEY, AND KARL BAUMANN, OF URMSTON, ENGLAND.

APPARATUS FOR MEASURING OR INDICATING THE EFFICIENCY OF STEAM-CONDENSERS.

1,161,254.

Specification of Letters Patent.

Patented Nov. 23, 1915.

Application filed November 24, 1914. Serial No. 873,718.

*To all whom it may concern:*

Be it known that we, ARTHUR EDWIN LEIGH SCANES, a subject of the King of Great Britain, and a resident of Ashton-upon-Mersey, in the county of Chester, England, and KARL BAUMANN, a citizen of the Confederation of Switzerland, and a resident of Urmston, in the county of Lancaster, England, have invented a new and useful Improvement in Apparatus for Measuring or Indicating the Efficiency of Steam-Condensers, of which the following is a specification.

This invention relates to apparatus for measuring or indicating the efficiency of steam condensers and has for its object to provide improved apparatus of this character.

In order to ascertain the efficiency of a steam condenser the temperatures existing at certain points in the condenser may be taken and compared. For example the following temperatures may be advantageously ascertained, the inlet temperature of the cooling water (hereinafter called $t_1$) the outlet temperature of the cooling water (hereinafter called $t_2$) the vacuum in the condenser or the steam temperature (hereinafter called $t_3$) the temperature of the hot well (hereinafter called $t_4$) and the air suction temperature (hereinafter called $t_5$). The condenser will be working well if the difference between the steam inlet temperature and that of the water outlet ($t_3 - t_2$) is small, for example in the neighborhood of 10° Fahrenheit. Under ordinary circumstances the difference between these temperatures ($t_3 - t_2$) should be approximately the same notwithstanding variations in the temperature of the cooling water used and this difference of temperature therefore may be taken as a measure of the efficiency of a condenser under varying conditions.

Although the efficiency of a steam condenser may be ascertained in the way just described this method has not been adopted owing to the fact that it is necessary to measure the temperatures at different points in the condenser some of which are very difficult to get at. If, however, the temperatures at various points in the condenser, such for instance as those indicated above, could all be read at the same time it would be possible not only to readily ascertain whether the condenser was working efficiently but also in the contrary case to detect the cause of low vacuum which might be due to lack of circulating water, dirty condenser tubes, air leakage, an inefficient air pump, or some other cause.

According to this invention thermometers are used for measuring the temperatures at selected points in the condenser which thermometers are arranged in proximity to one another so that they can be read at a glance, the temperatures existing at the selected points being communicated to the thermometers by suitable means such as water jackets, or the like, connected with the aforesaid points in the condenser.

In order that the nature of the invention may be clearly understood the same will now be described with reference to the accompanying drawings which indicate diagrammatically, by way of example, several forms in which the invention may be carried into effect.

In the drawings Figure 1 is a diagrammatic view showing one form of the invention, and Fig. 2 a similar view illustrating a modification. Fig. 3 is a diagrammatic view and Fig. 4 a plan illustrating a further modification of the invention in which thermometers of a type different from those shown in Figs. 1 and 2 are employed.

Referring now to Fig. 1, a plurality of thermometers, in this case five, is mounted on a suitable base or support 6. The thermometers reading from left to right will be hereinafter referred to as $T_1$, $T_2$, $T_3$, $T_4$ and $T_5$, and are respectively adapted to measure the temperatures hereinabove referred to by the lower case letter $t$ in connection with the same numerals. The bulbs 7, 7 . . . of the thermometers are surrounded by water jackets 8, 8 . . ., having inlets 9, 9 . . ., and outlets 10, 10 . . . The jacket 8 of the thermometer $T_1$ is connected to the inlet for the cooling water for the condenser while the jacket for the thermometer $T_2$ is so connected with the condenser that some of the discharged cooling water may flow through said jacket. The jacket for the thermometer $T_4$ is connected with the hot well so that the condensed steam may flow through this jacket. The jackets corresponding to the thermometers $T_3$ and $T_5$ are connected to coils located in the vacuum space and at the off-take or air discharge for the air pump respectively. Water is caused to circulate through these coils which will be heated up to the surrounding temperatures, the water in said coils then passing through the jackets surrounding the thermometers to which they are respectively connected. In this way the temperature $t_3$ of the steam and the temperature $t_5$ of the mixture of air and vapor at the air discharge to the air pump $t_5$ may be communicated to the thermometers $T_3$ and $T_5$. Instead of using water jackets the thermometers may be provided with long capillary tubes, in which case the expansion bulbs containing mercury or other liquid will be located at the appropriate places in the condenser. A further method of communicating the temperature $t_3$ is to by-pass steam from the condenser through a pipe to a jacket surrounding the thermometer $T_3$ or the latter may be inserted into the by-pass steam pipe. When such a construction is employed, the jacket 8 of the thermometer $T_3$ may be connected to an open pipe or passage which communicates with the interior of the condenser at a region of relatively high pressure, and the outlet port 10 of the jacket may be connected to a region within the condenser of relatively low pressure, as for example, near the air off-take port. The thermometers are preferably arranged in the order $T_1$, $T_2$, $T_3$, $T_4$, $T_5$. In this way a natural arrangement is obtained indicating the transmission of heat from the steam into the water. The water inlet temperature $t_1$ is increased to the temperature $t_2$ of the outflowing cooling water which is below the steam temperature $t_3$, which is the maximum temperature in the condenser. The steam itself is condensed and the water flows out at a temperature $t_4$ which is below the temperature $t_3$, the air mixture being further cooled to a temperature $t_5$ which when the condenser is working satisfactorily will be somewhat below the temperature $t_4$. It is not, however, essential that the thermometers should be arranged in this order. For example they may be arranged in the order $T_1$, $T_3$, $T_4$, $T_2$ and the thermometer $T_5$ omitted altogether. Under ordinary conditions the readings on the several thermometers indicate points on characteristic curves, the curves varying depending on whether the condenser is working at full or partial load. For no-load all temperatures are the same, that is to say are equal to the temperature of the inlet water. In this way the efficiency of the condenser can be ascertained when working at any load. These curves are predetermined and if necessary calibrated for each apparatus and if the readings vary from the standard curves so ascertained an indication is afforded that the condenser is not working under the most satisfactory conditions. For instance, if the vacuum were to fall off the temperature $t_3$ would be indicated as being too high and the cause of the low vacuum could be ascertained by examining the readings given by one or more of the other thermometers. If the thermometer indicating the temperature $t_2$ reads too high at the same time, that is to say reads above the curve corresponding to the load on the condenser it would indicate a shortage of cooling water, or, if the thermometer indicating temperature $t_5$ reads too high it would indicate that the condenser is dirty, while on the contrary if this temperature were too low it would indicate excessive air leakage or a decrease in air pump capacity. If desired an additional thermometer may be employed located in proximity to the others for measuring the temperature of the air pump sealing water. By air pump sealing water we mean the water employed for sealing the valves of the air pump, in case a reciprocating pump is employed. The above mentioned characteristic curves are conveniently inscribed on a card or plate 11, supported from the base 6 and located behind the thermometers so that any indication given by one or more of the latter which varies from that shown on the curve may be readily observed. In order to simplify the use of the apparatus the card or plate on which said curves are inscribed is preferably adjustably supported by means such as the screw 12 so that its position may be adjusted to correspond with variations in the inlet temperature of the cooling water. If the position of the card or plate 11 is adjusted by means of the screw 12 so that the level of the mercury in the thermometer $T_1$ corresponds with the appropriate curve (full load, half load, etc., as the case may be) the level of the mercury in the remaining thermometers $T_2$, $T_3$, $T_4$, $T_5$ should also fall on said curve. If this does not occur it will indicate that the condenser is not working efficiently and the cause of the inefficient operation may be ascertained by observing which of the thermometer readings does not correspond with the curve as hereinabove described.

In Fig. 2 a modification is indicated in which the thermometer $T_5$ is omitted and in place of the thermometer $T_3$ an absolute pressure gage of a suitable kind is substituted. A suitable form of such a gage is one consisting of a U-tube having one end sealed and exhausted of air and containing mercury. An improved form of gage of this kind is described in the application for British Patent No. 8170 filed 7th April 1913 by A. E. L. Scanes, one of the present applicants. When this form of the apparatus is used it is convenient to arrange that the bores of the capillary tubes of the thermometers and of the indicating tube of the absolute pressure gage are approximately equal so that with a normal range of temperatures under working conditions the reading in the gage tube of the pressure gage will form a convenient characteristic curve with the thermometer readings. In Fig. 2 the thermometers $T_1$, $T_4$, $T_2$ are indicated as having water jackets 8, 8 . . . , inlets 9, 9 . . . , and outlets 10, 10 . . . , connected up as in Fig. 1. $P_3$ indicates the absolute pressure gage which is substituted for the thermometer $T_3$, the open end 13 of the down tube of this gage being connected to the vacuum space of the condenser. It will be noticed that the thermometers are arranged in a different order from that shown in Fig. 1 and this changes somewhat the shape of the characteristic curve. The instrument is, however, used in the same way as that described in connection with Fig. 1.

For the sake of simplicity, in Figs. 1 and 2 only two characteristic curves have been shown on the plate 11 but it will generally be found convenient to inscribe several curves on this plate corresponding with various loads on the condenser.

Figure 4:
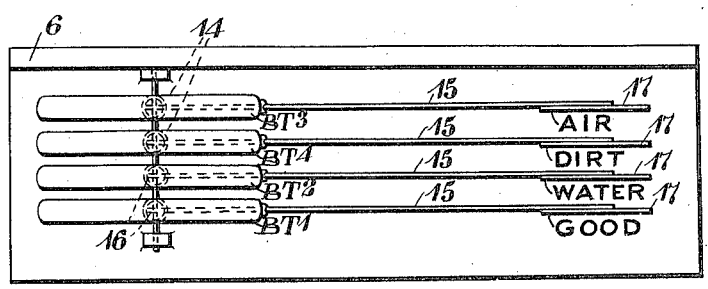

Figs. 3 and 4 indicate diagrammatically how the invention may be carried into effect with thermometers of a suitable type other than the type above described, for example, the well known Fournier thermometer, in which suitable volatile liquids inclosed in receivers which may be located at the selected points in the condenser, the vapor pressures generated in such receivers operating pressure gages in the form of Bourdon tubes. In the present instance the Bourdon tubes are indicated at B $T_1$, B $T_2$, B $T_3$, B $T_4$, the tubes and the liquid containing receivers in the condenser being connected by means of the pipes 14. The indicating arms or pointers 15, 15 . . . , are connected with the tubes and at one end oscillate about a fixed axis 16, in this case a rod or wire attached to the base 6. Each of the arms or pointers is provided at its other end with a disk 17 on which a suitable legend may be inscribed. As indicated in Fig. 4 the legends attached to the disks in the example illustrated are as follows:—On the disk attached to the thermometer B $T_1$ the word "Good"; on the disk of the thermometer B $T_2$ the word "Water"; on the disk of the thermometer B $T_4$ the word "Dirt", and on the disk of the thermometer B $T_3$ the word "Air", the thermometers being preferably arranged in the order B $T_1$, B $T_2$, B $T_4$, B $T_3$, reading from front to back.

To prepare the above described instrument for use the thermometers B $T_1$, B $T_2$, etc., and their pointers 15, 15 . . . , and disks 17 should be so calibrated that the disks 17 lie all in the same horizontal plane when the thermometers are reading the normal differences of temperature which occur with the condenser working efficiently. To make the operation and use of the instrument quite clear the following temperatures may be taken as an example of the differences existing at the selected points of a condenser working efficiently, the readings being on the Fahrenheit scale:—

$$t_1 = 60$$
$$t_2 = 92$$
$$t_3 = 101.5$$
$$t_4 = 92$$

With the thermometers indicating these temperatures all the disks should lie one behind the other and be obscured by the front disk attached to the thermometer B $T_1$ on which the legend "Good" appears, thus indicating that the condenser is working efficiently. If the temperature of the inlet water should change, the remaining temperatures should also change in proportion. For example, if—

$$t_1 = 70$$
$$t_2(\text{should}) = 102$$
$$t_3 = 111.5$$
$$t_4 = 102$$

The result will be that the disks still all lie in substantially the same plane and are obscured by the front one attached to thermometer B $T_1$. If, however, for example the temperatures should be as follows:—

$$t_1 = 60$$
$$t_2 = 92$$
$$t_3 = 110$$
$$t_4 = 92$$

the disk attached to the thermometer B $T_3$ would rise showing the word "Air" and indicating that there was an excess of air in the condenser due to leakage, or a faulty air pump, or some other cause. Again, if the temperatures should be:—

$$t_1 = 60$$
$$t_2 = 98$$
$$t_3 = 107.5$$
$$t_4 = 98$$

the disks attached to thermometers B $T_2$ and B $T_3$ would rise but as B $T_2$ is in front it would obscure B $T_3$ and the word "Water" would therefore become visible indicating that more water is required to again bring down the temperature $t_3$ to 101.5.

To take one more example, assume that the temperatures were as follows:—

$$t_1 = 60$$
$$t_2 = 92$$
$$t_3 = 110$$
$$t_4 = 100$$

the disks B $T_3$ and B $T_4$ would both rise, but as the disk attached to thermometer B $T_4$ is in front of that attached to thermometer B $T_3$ it would obscure the latter and the word "Dirt" would appear thus showing that the condenser tubes were dirty and needed cleaning.

In the above example the thermometer indicating the temperature $t_5$ has been omitted as this is not needed and only tends to complicate this form of the apparatus unnecessarily.

While we have described several modifications of our invention, it will be apparent to those skilled in the art that various changes, modifications, substitutions, additions and omissions may be made in the apparatus illustrated without departing from the spirit and scope of the invention as set forth by the appended claims.

What we claim is:

1. An apparatus of the character described, comprising a plurality of devices, each for indicating variations of conditions at different portions of a condenser, separate means communicating with each device and with the interior of the condensers, and a movable chart coöperating with said devices for indicating in conjunction with said devices variations from normal operating conditions of the condenser.

2. An apparatus for measuring or indicating the efficiency of a steam condenser, comprising a plurality of thermometers arranged in proximity one to the other, a separate passage for placing one thermometer in communication with the cooling water inlet of the condenser, a separate passage for placing another of the thermometers in communication with the cooling water discharge of the condenser, a separate passage for placing another of said thermometers in communication with the interior of the condenser and for delivering steam from the condenser to the thermometer, and a separate passage for delivering a portion of the water of condensation leaving the condenser to still another of said thermometers, said thermometers being so located with relation to each other that they indicate a deviation from normal operating conditions of the condensers.

In testimony whereof, we have hereunto subscribed our names this 23rd day of October, 1914.

ARTHUR EDWIN LEIGH SCANES.

Witnesses:
   JAS. STEWART BROADFOOT,
   MARGARET S. MAYOH.

KARL BAUMANN.

Witnesses:
   A. S. COCHERVAILLE,
   W. T. SKERTEN.

Copies of this patent may be obtained for five cents each, by addressing the "Commissioner of Patents, Washington, D. C."